(12) United States Patent
Zhang et al.

(10) Patent No.: US 11,163,510 B1
(45) Date of Patent: Nov. 2, 2021

(54) SYSTEM AND METHOD FOR SELECTIVE GROUP PRINTING AT DISCOUNTED PRICING

(71) Applicant: Toshiba TEC Kabushiki Kaisha, Shinagawa-ku (JP)

(72) Inventors: Jia Zhang, Irvine, CA (US); Christopher Nguyen, Lake Forest, CA (US); William Su, Riverside, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 17/007,285

(22) Filed: Aug. 31, 2020

(51) Int. Cl.
*G06F 3/12* (2006.01)
*G06Q 30/02* (2012.01)

(52) U.S. Cl.
CPC .......... *G06F 3/1262* (2013.01); *G06F 3/1218* (2013.01); *G06F 3/1286* (2013.01); *G06F 3/1288* (2013.01); *G06Q 30/0237* (2013.01)

(58) Field of Classification Search
CPC .... G06F 3/1262; G06F 3/1218; G06F 3/1286; G06F 3/1288; G06Q 30/0237
USPC ....................................................... 358/1.15
See application file for complete search history.

(56) References Cited

U.S. PATENT DOCUMENTS

| | | | |
|---|---|---|---|
| 2011/0047012 A1* | 2/2011 | Sherman | G06Q 30/02 705/14.1 |
| 2011/0196731 A1* | 8/2011 | Christie | H04L 9/3263 705/14.26 |
| 2014/0063514 A1* | 3/2014 | Roy | G06Q 50/01 358/1.9 |
| 2015/0077800 A1* | 3/2015 | Yamagishi | G06F 3/1208 358/1.15 |
| 2017/0308340 A1* | 10/2017 | Roberts | H04N 1/00923 |
| 2019/0163423 A1* | 5/2019 | Nishio | G06F 3/1262 |
| 2019/0236662 A1* | 8/2019 | Sun | H04L 63/08 |

* cited by examiner

*Primary Examiner* — Allen H Nguyen
(74) *Attorney, Agent, or Firm* — Ulmer & Berne LLP (57) ABSTRACT

A system and method for selective group printing at discounted pricing facilitates a user to select one or more public electronic documents for printing. The user creates a print group for their job and publishes an electronic list of print group jobs, including job properties, print timing and print location. Users who wish to have the same documents printed can elect to join the group to allow for discounted pricing. When it is time to print jobs associated with the group, group members are notified and can proceed to the designated printer to release their jobs.

20 Claims, 6 Drawing Sheets

SYSTEM AND METHOD FOR SELECTIVE GROUP PRINTING AT DISCOUNTED PRICING

TECHNICAL FIELD

This application relates generally to reducing user print costs for group printing.

BACKGROUND

Document processing devices include printers, copiers, scanners and e-mail gateways. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Printing of electronic documents can be expensive, particularly when dealing with large documents comprising many pages. In the case of individuals, large documents can be prohibitively expensive. By way of particular example, students may frequently need to print large documents needed for completing assignments. However, students, such as college students, may be on a limited budget. All students in a particular class may need a printout of the same document, and each student must pay for the full cost of a printout.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

There are occasions where multiple users print the same public documents. Such situations include, for example, sales order forms, doctor medical forms or student printing of course-related files. In many situations, a user does not need printouts urgently. Also, multiple people may wish to obtain their printouts at the same time, such as after class or at the end of the school day.

The subject application includes example embodiments which provide a mechanism for a user to set up a print group with expiration time and post a print job on a public central printer electronic bulletin board. In another example embodiment, a user may publish their print request by emailing notification, such as emailing all students sharing the same class. Since the print job is public, other people can view the document and see if they want to join. As more people join the group, a lower price may be available for bulk printing. The sooner people join the group or the more people that join the group may result in additional discounts for all.

When a group organizer creates the group, the system automatically checks if the same print job is active in the system. If so, the system notifies the user that there is already a group, giving them the option to join the other print group or continue to form a duplicate group which would then also be published. A user may elect to create a duplicate group in certain situations, for example if the user needs their printout before the earlier group print is scheduled. Other users could then view the print timing and costs associated with both groups when they too wish the same printout, and choose which ever group best fits their needs.

People who join the group can select how the job is released. For example, they may release the job with the group or release the job on any MFP they like. If they select release the job with the group, a greater discount may be applied to the job. Group printing can be more efficient and provide cost savings. Group printing requires less frequent warmup and cool down events for the MFP, less wear and tear of the MFP, and more efficient MFP resource utilization since printing occurs serially.

Group members may set up an alert, such as with text, voice messages or email. When a group expiration time is set, users are notified as to a particular device where the print job will be released if it is released. Meanwhile group member's accounts are charged. Users can also release their print jobs from any printer if they select to release them separately or pick up their job at the group printer.

In accordance with further example embodiments, a user can create a print group through centralized printer bulletin board. The user can define a group scope. By way of example, the user can create a group for all students within one class, within same department, or within an entire school. The user can post group printing job on a bulletin board, so that others are able to evaluate whether they wish to join. The user can define a printout time, a printout location, expiration time or printer settings, such as color, black-and-white, duplex, N-up, or the like, and this information can also be published to allow others to decide whether to join. The user may also ask the system to find a best match printer, such as by location, cost, printer capabilities, or the like. Additional users may select how their particular print job is released, such as with the group or released to an MFP convenient to them. When other users elect to print with group, a discount may be applied. When people sign up the group, they are enabled to set up alerts through text, voicemail or email. When a printing group expires, they receive notification of the name of the printer, location of the printer, final price of their print job. User accounts are charged when they receive such notification.

In further example embodiments, administrators can set a printing price structure based on the quantity of printing.

When more people join the group or when people join sooner, the greater the discount. An administrator may also set a promotional price structure based on a season, event, document type or via an MFP with lower operational costs or one that is underutilized.

Figure 1:
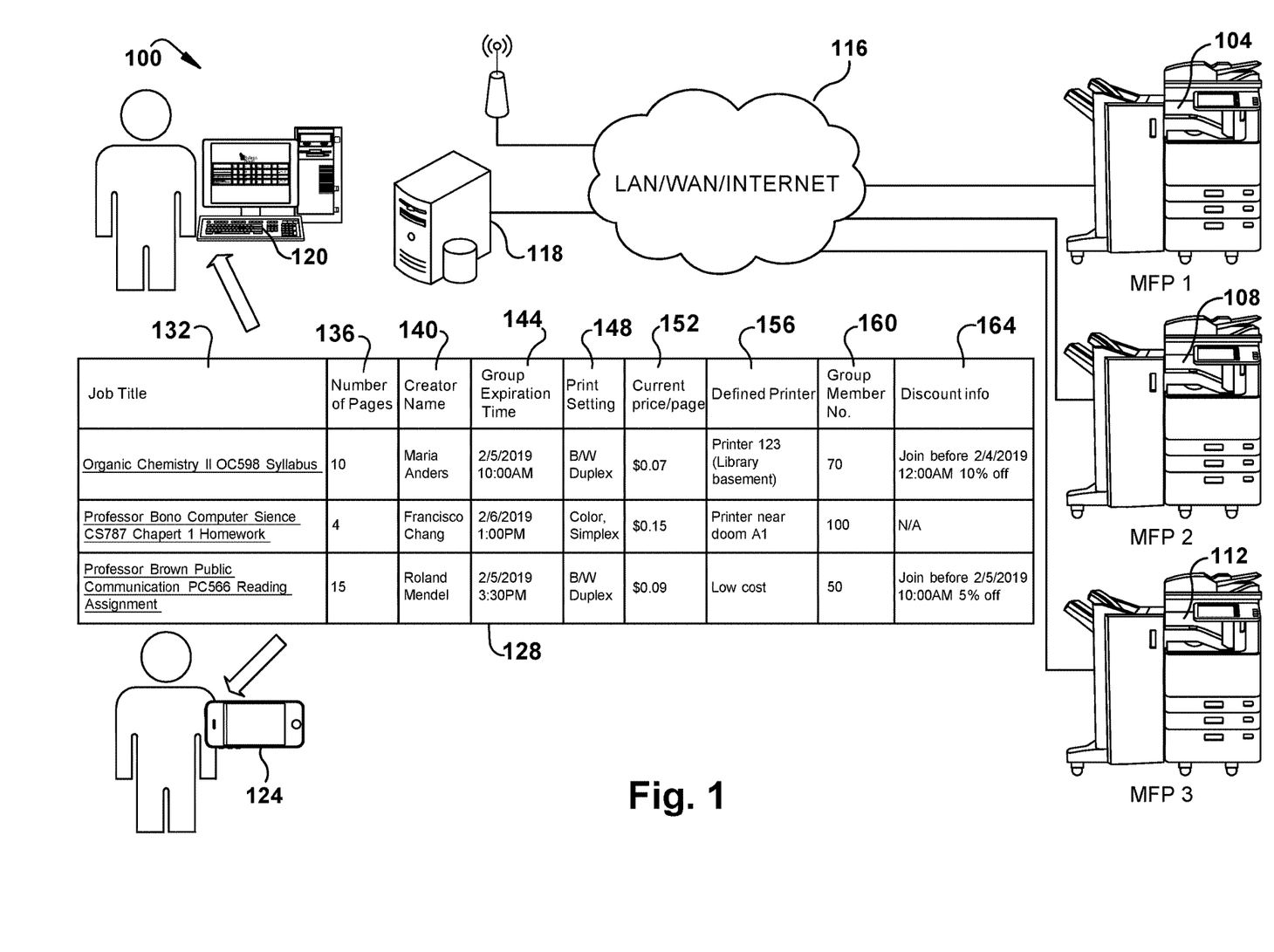
FIG. 1 is an example embodiment of a system for selective group printing at discounted pricing.

In accordance with the subject application, FIG. 1 illustrates an example embodiment of a system 100 for selective group printing at discounted pricing. The system includes one or more MFPs, such as MFPs 104, 108 and 112. The MFPs are in data communication via network cloud 116 suitably comprised of a local area network (LAN), a wide area network (WAN), which may comprise the Internet, or any suitable combination thereof. Network cloud 116 is suitably comprised of any suitable wired or wireless protocol.

Also in data communication with network cloud 116 is server 116, and one or more user devices such as workstation 120 and smartphone 124. Server 116 suitably stores public documents of interest to multiple users. Users may make print requests, along with requests to create and publish a group with their data devices through server 118. Server 118, in turn, generates a public listing 128 of groups and their associated information. In the illustrated example, the listings include job title 132, number of print pages 136, group creator name 140, print settings 148, price per printed page 152, defined printer 156, number of group members 160 and current discount information 164. Of these, a group creator may supply all information except for group members 160 and current discount information 164 insofar as this is subject to change based on group participants. Information in public listing 128 may also be published to one or more users via text or email received by users via workstation 120 or smartphone 124, to potentially interested group members, notification subscribers, classmates, business colleagues, or the like.

Figure 2:
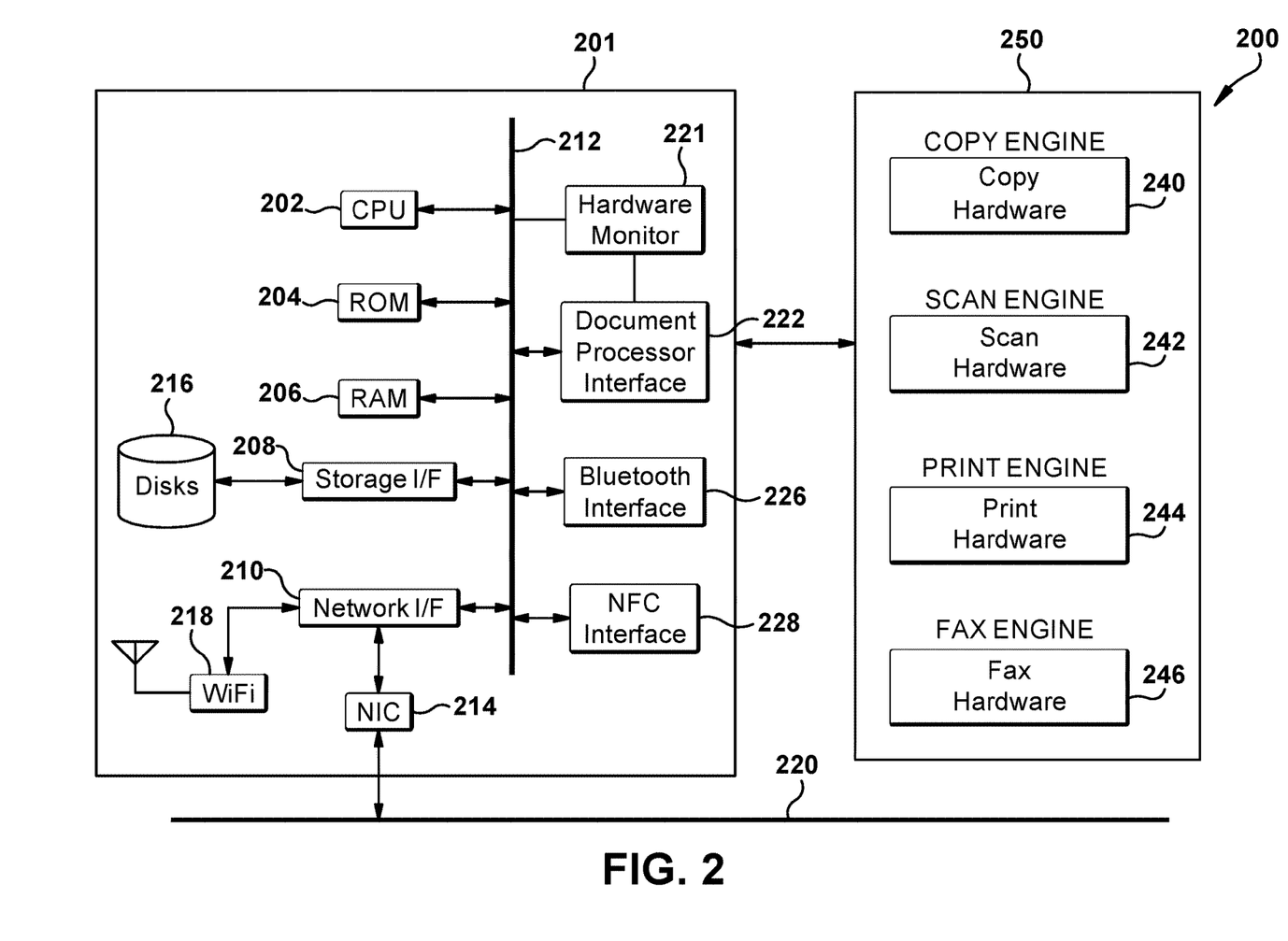
FIG. 2 is an example embodiment of a networked digital device such as a multifunction peripheral.

Turning now to FIG. 2 illustrated is an example embodiment of a networked digital device comprised of document rendering system 200 suitably comprised within an MFP, such as with MFPs 104, 108 and 112 of FIG. 1. It will be appreciated that an MFP includes an intelligent controller 201 which is itself a computer system. Included in controller 201 are one or more processors, such as that illustrated by processor 202. Each processor is suitably associated with non-volatile memory, such as read only memory (ROM) 204, and random access memory (RAM) 206, via a data bus 212.

Processor 202 is also in data communication with a storage interface 208 for reading or writing data with storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via a wireless network interface, such as WiFi 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 is also in data communication with a hardware monitor 221, suitably amassing state data from subassemblies, sensors, digital thermometers, or the like, and suitably including digital state date including device codes, such as device error codes. Processor 202 can also be in data communication a document processor interface 222, with BLUETOOTH interface 226 and NFC interface 228 via data path 212.

Processor 202 can also be in data communication with any suitable user input/output (I/O) interface (not shown) which provides data communication with user peripherals, such as displays, keyboards, mice, track balls, touch screens, or the like.

Document processor interface 222 is suitable for data communication with MFP functional units 250. In the illustrate example, these units include a copy engine, suitably comprised of copy hardware 240, a scan engine, suitably comprised of scan hardware 242, a print engine, suitably comprised of print hardware 244 and a fax engine, suitably comprised of fax hardware 246. These subsystems together comprise MFP functional hardware 250. It will be understood that functional units are suitably comprised of intelligent units, including any suitable hardware or software platform.

Figure 3:
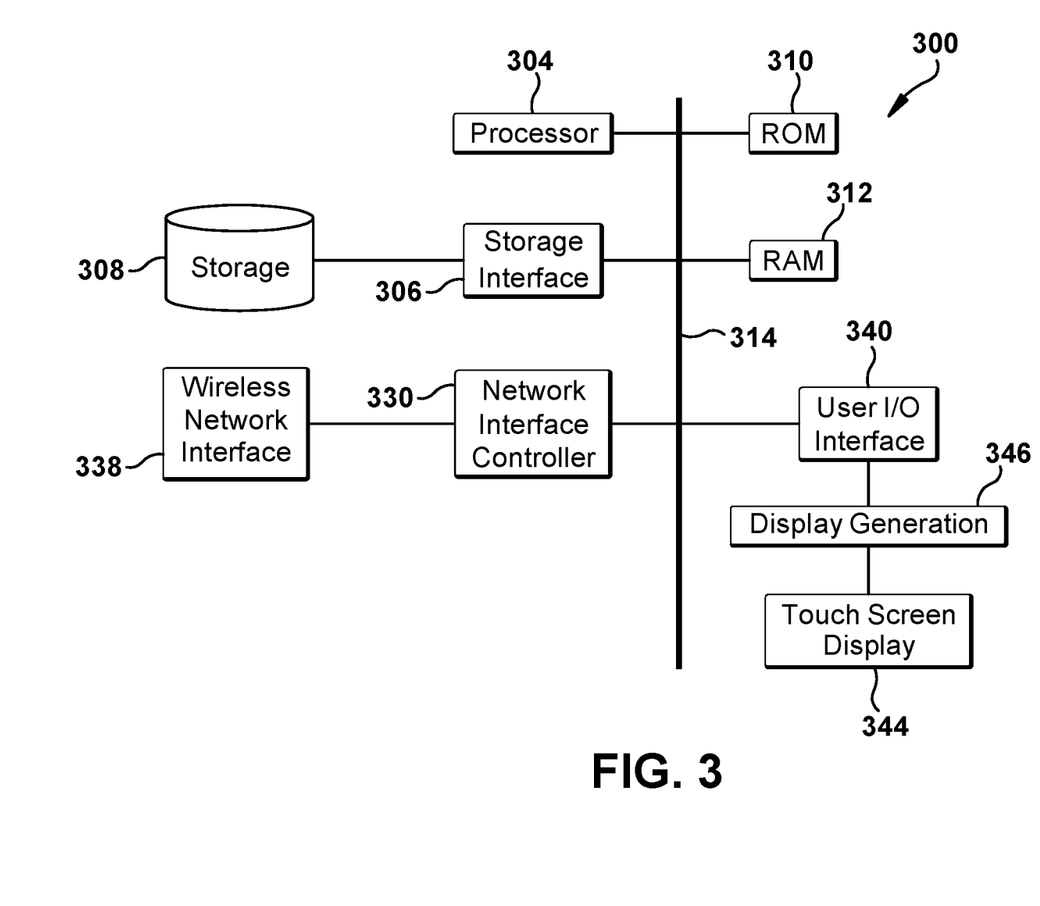
FIG. 3 is an example embodiment of a digital device system such as a server, workstation or smartphone.

Turning now to FIG. 3, illustrated is an example of a digital device system 300 suitably comprising server 116, workstation 120 or smartphone 124 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to an MFP or server is via a data network, such as a local area network (LAN), a wide area network (WAN), which may comprise the Internet, or any suitable combination thereof. A digital data connection is also suitably directly with an MFP or server, such as via BLUETOOTH, optical data transfer, Wi-Fi direct, or the like.

Processor 304 is also in data communication with a user input/output (I/O) interface 340 which provides data communication with user peripherals, such as touch screen display 344 via display generator 346, as well as keyboards, mice, track balls, touch screens, or the like. It will be understood that functional units are suitably comprised of intelligent units, including any suitable hardware or software platform.

Figure 4:
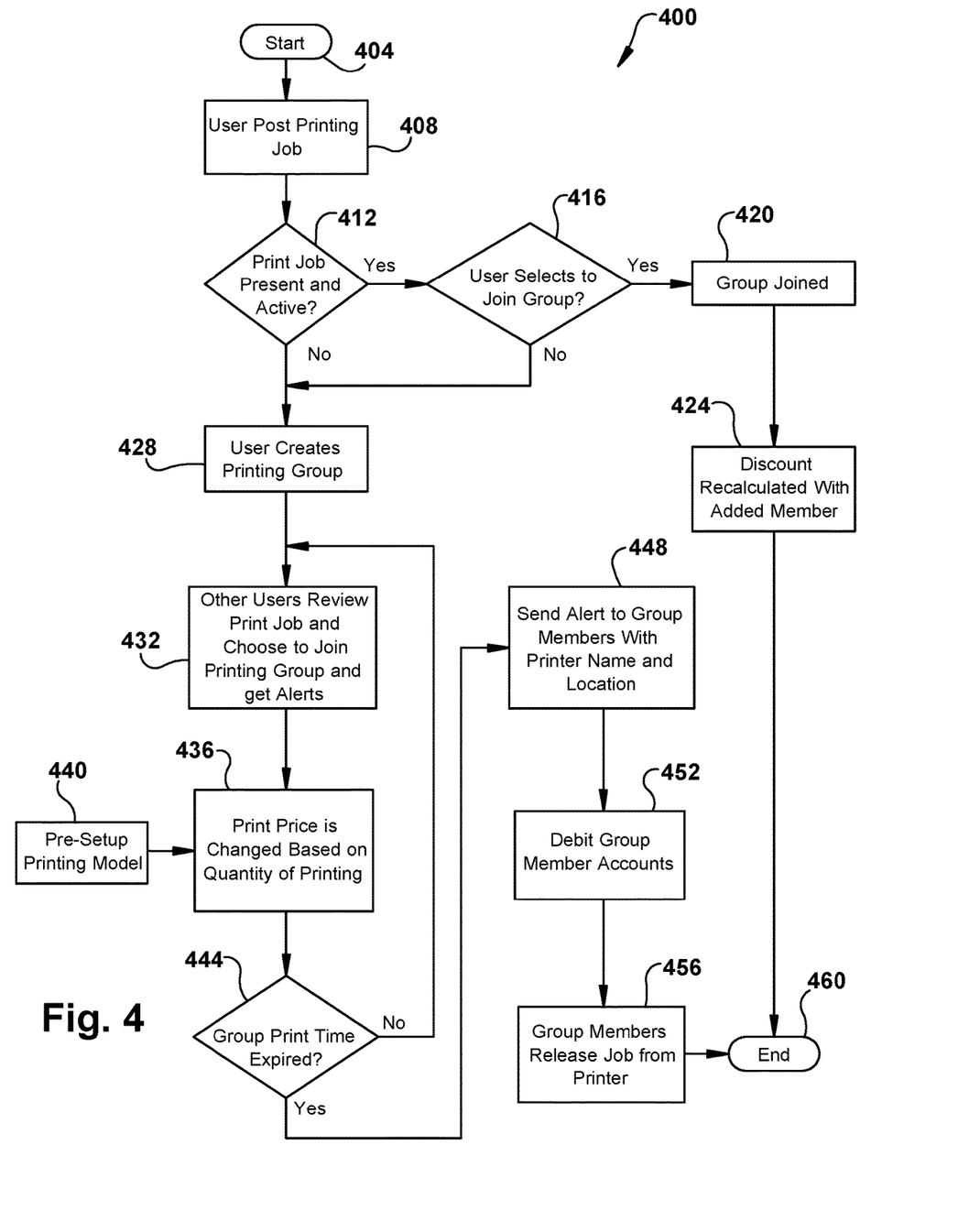
FIG. 4 is a flowchart of example operations of a system for selective group printing at discounted pricing.

FIG. 4 illustrates a flowchart 400 of an example embodiment of a system for selective group printing at discounted pricing. The process commences at block 404 and progresses to block 408 where a user elects to post a printing job for one or more public documents they have selected. If one or more existing and active groups share the same print job as determined at block 412, the user may elect to join the earlier group or a selected one of the earlier groups at block 416. If they do, they are added to the group at block 420, and a discount for that group is recalculated at block 424 in the event that the new group member merits further bulk discounting. The process then ends at block 460 insofar as it is under control from the previously created group.

If the user elects to not join an earlier group at block 416, the process proceeds to block 428 where the user creates a new group, suitably providing information as noted above. The new group information is published at block 432, and a print cost is calculated at block 436 with input from presetup printing model 440. A determination is made at block 444 as to whether a specified time duration has expired. If not, the process returns to block 432 to allow additional users to join the group printing. If so, the process proceeds to block 448 where group members are notified of printing at a specified printer. Costs are assessed to each group member at block 452. Group members individually proceed to the designated MFP at block 456 to release the respective jobs, and the process ends at block 460.

Figure 5:
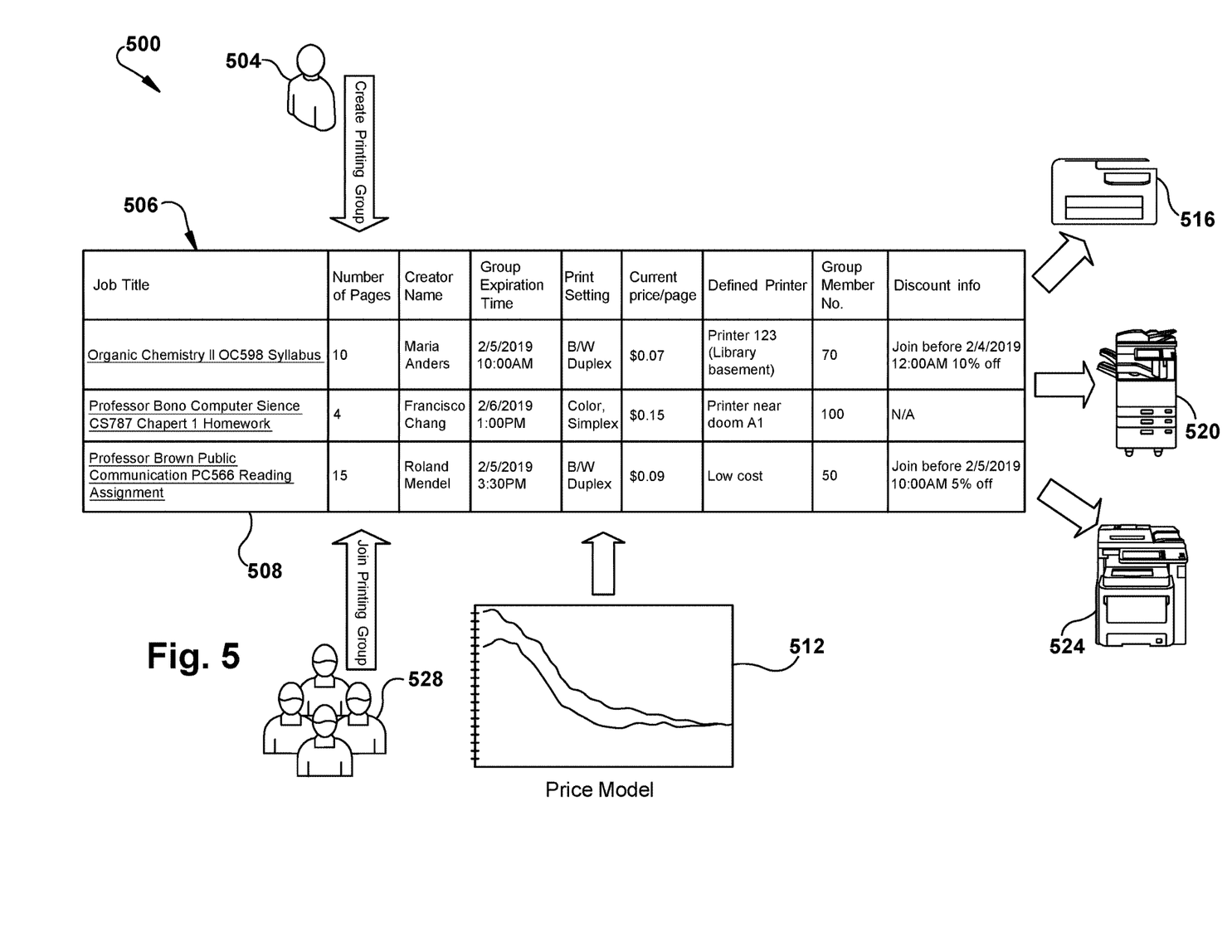
FIG. 5 is an example embodiment of a system overview of a system for selective group printing at discounted pricing.

FIG. 5 illustrates system overview 500 for a system for selective group printing at discounted pricing. User 504 creates a print group, such a print group 506 appearing in a list 508 of published print groups. Pricing model 512 displays a chart of the prices for selective group printing based on the number of users that join a particular print group. Users 528 selectively join group 506, and their common print jobs are printed by a default device or one specified by user 504, such as print devices 516, 520 or 524.

Figure 6:
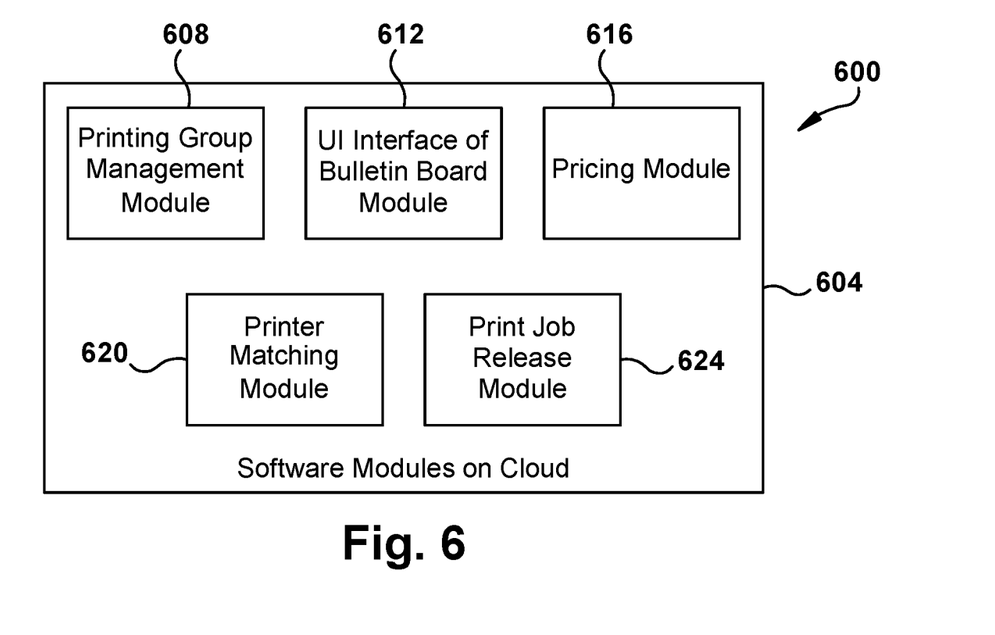
FIG. 6 is an example embodiment of a cloud based software modules for implementing selective group printing at discounted pricing.

FIG. 6 is an example embodiment of a software block diagram 600 for a system for selective group printing at discounted pricing. Suitable modules 604 are suitably disposed on a cloud server, such as server 118 of FIG. 1. Included is a printing group management module 608, a bulletin board user interface module 612, a pricing module 616, a printer matching module 620 and a print job release module 624.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a network interface configured to receive, from a first user, a first print request for printing of one or more previously stored electronic documents,
the network interface further configured to receive, from the first user, a print group instruction for the first print request; and
a processor and associated memory,
the processor configured to generate a print group of documents specified by the first print request responsive to a received print group instruction,
the processor configured to determine an initial cost associated with printing of electronic documents in the print group,
the processor further configured to generate a non-private listing of the print group,
the processor further configured to receive, from at least a second user, responsive to the listing, at least a second print request for at least a second printing of the print group,
the processor further configured to determine a discounted cost associated with printing of a copy of the print group for each print request, and
the processor further configured to generate a print of multiple copies of the print group at a single location and at the discounted cost.

2. The system of claim 1 wherein the processor is further configured to receive instructions from one or more users to print their copy of the print group at a different time or location than that associated with the print at the initial cost.

3. The system of claim 1 wherein the processor is further configured to:
determine whether the first print request corresponds to a pending print for an existing, print request group,
prompt the first user to for an instruction whether to join the pending print request group,
receive an instruction from the first user responsive to the prompt, and
selectively add the first user to the existing print request group in accordance with a received instruction.

4. The system of claim 1 wherein the processor is further configured to generate the print in accordance with a specified timing.

5. The system of claim 4 wherein the specified timing is received from the first user.

6. The system of claim 4 wherein the processor is further configured to notify each user of the specified timing after receipt of each print request.

7. The system of claim 1 wherein the processor is further configured to recalculate the discounted cost each time a new user requests a printing of the print group.

8. The system of claim 7 wherein the processor is further configured to recalculate the discounted cost after receipt of each instruction to print a copy of the print group at a different time and location.

9. The system of claim 7 wherein the processor is further configured to communicate each recalculated discounted cost to each user awaiting a printout of the print group.

10. A method comprising:
receiving, from a first user, a first print request for printing of one or more previously stored electronic documents;
receiving, from the first user, a print group instruction for the first print request;
generating a print group of documents specified by the first print request responsive to a received print group instruction;
determining an initial cost associated with printing of electronic documents in the print group;
generating a non-private listing of the print group;
receiving, from at least a second user, responsive to listing, at least a second print request for at least a second printing of the print group;
determining a discounted cost associated with printing of a copy of the print group for each print request; and
generating a print of multiple copies of the print group at a single location and at the discounted cost.

11. The method of claim 10 further comprising receiving instructions from one or more users to print their copy of the print group at a different time or location than that associated with the print at the initial cost.

12. The method of claim 10 further comprising:
determining whether the first print request corresponds to a pending print for an existing, print request group;
prompting the first user to for an instruction whether to join the pending print request group;
receiving an instruction from the first user responsive to the prompt; and
selectively adding the first user to the existing print request group in accordance with a received instruction.

13. The method of claim 10 further comprising generating the print in accordance with a specified timing.

14. The method of claim 13 further comprising receiving the specified timing from the first user.

15. The method of claim 13 further comprising notifying each user of the specified timing after receipt of each print request.

16. The method of claim 10 further comprising recalculating the discounted cost each time a new user requests a printing of the print group.

17. The method of claim 16 further comprising recalculating the discounted cost after receipt of each instruction to print a copy of the print group at a different time and location.

18. The method of claim 16 further comprising communicating each recalculated discounted cost to each user awaiting a printout of the print group.

19. A system comprising:
a network interface;
a user interface configured to receive from a user a request for a printout of a print group comprised of a selection from the user of one or more previously stored electronic documents,
the user interface further configured to receive a group request for the print group from the user, and
the user interface further configured to receive a specified timing and print location for a printing of the print group; and
a processor and associated memory,
the processor configured to send a request for publication of information about existence of content, specified timing and print location of the print group printing via the network interface.

20. The system of claim 19 wherein
the processor is further configured to generate a prompt to the user on the user interface corresponding to a pending print of previously created print group including the same electronic documents of the print group, and
the processor is further configured to receive a selection from the user via the user interface to join the previously created print group and cancel the group request.

* * * * *